March 8, 1960     R. M. JACKSON     2,928,034
CHRONOMETRIC ELECTRIC MOTOR
Filed Aug. 22, 1957     2 Sheets-Sheet 1

INVENTOR
RODERICK M. JACKSON

BY
ATTORNEY

March 8, 1960  R. M. JACKSON  2,928,034
CHRONOMETRIC ELECTRIC MOTOR
Filed Aug. 22, 1957  2 Sheets-Sheet 2

INVENTOR
RODERICK M. JACKSON

BY  *M. M. Gould*

ATTORNEY

United States Patent Office 2,928,034
Patented Mar. 8, 1960

2,928,034

CHRONOMETRIC ELECTRIC MOTOR

Roderick M. Jackson, Lancaster, Pa., assignor to Hamilton Watch Company, Lancaster, Pa., a corporation of Pennsylvania Application August 22, 1957, Serial No. 679,640

6 Claims. (Cl. 318—330)

This invention relates to electric motors and more particularly relates to a chronometric electric motor capable of running at an extremely accurate fixed speed for long periods of time from a limited source of power.

In many types of applications, it is desirable to have a motor capable of running at a fixed speed with extremely little deviation from this speed. Such units may also be desired in portable types of equipment, so that it is often advantageous to have such a unit capable of operating over long periods of time from battery power without any decrease in the accuracy of maintenance of the predetermined speed.

It is accordingly a primary object of the present invention to provide an improved chronometric motor capable of running at a fixed speed within extremely accurate limits.

It is another object of the invention to provide an improved chronometric motor which is relatively low in cost and which can be operated for long periods of time from a limited source of electric power.

It is another object of the invention to provide an improved chronometric motor capable of delivering large amounts of power at accurately predetermined speeds.

These and further objects and advantages of the invention will become more apparent upon reference to the following specification and claims and appended drawings wherein:

Figure 1:
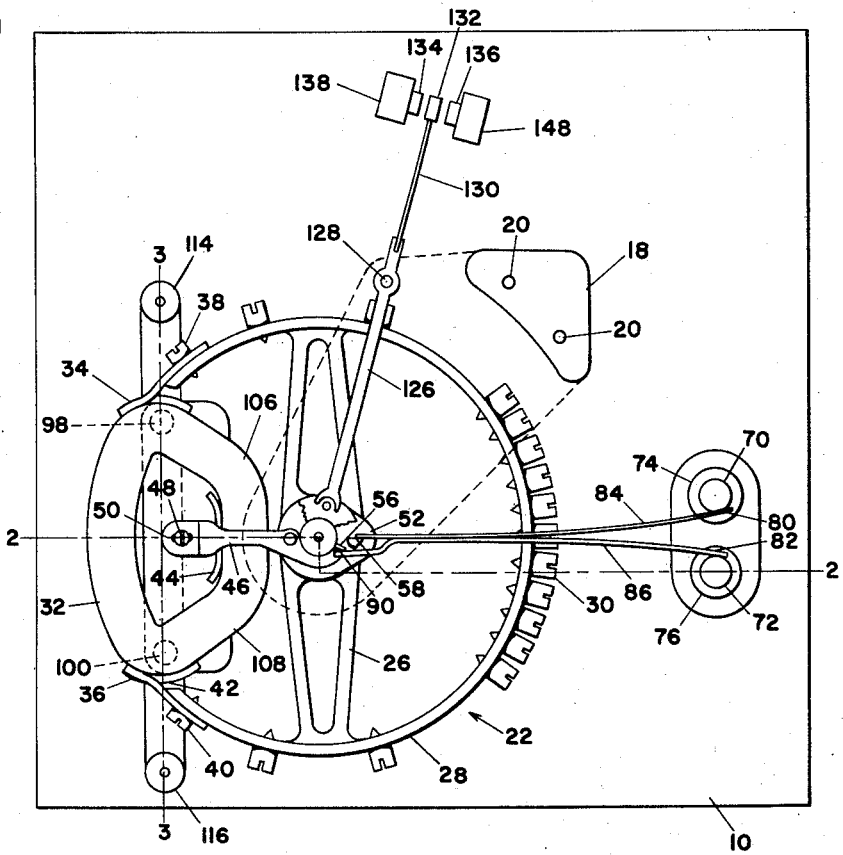
Figure 1 is a plan view of the isochronal control unit with its balance cock removed.
Figure 2:
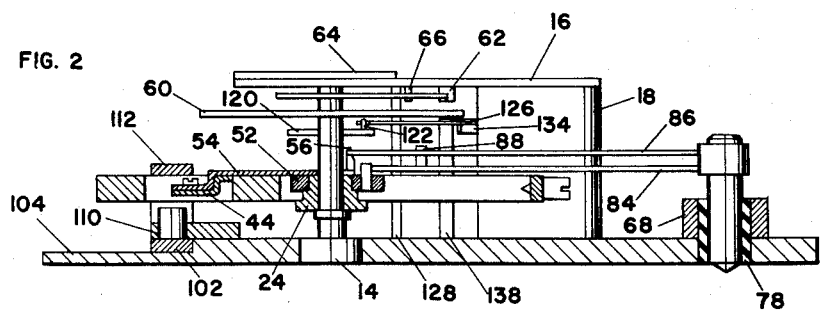
Figure 2 is a vertical section taken along the line 2—2 of Figure 1.
Figure 3:
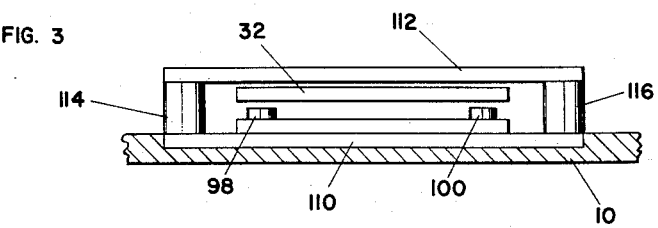
Figure 3 is a partial vertical section taken along the line 3—3 of Figure 1 and showing the shunt arrangement.
Figure 4:
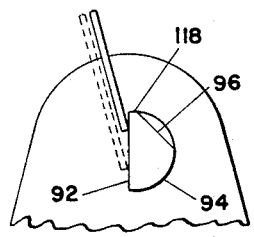
Figure 4 is a plan view of the roller table and pin.

Referring to Figures 1, 2 and 3 the isochronal element of the invention comprises a mounting plate 10 which carries a staff 12 in a bearing 14, which may be a jeweled bearing if desired. The upper end of the staff 12 is journaled in a similar bearing in a balance cock 16 mounted on a mounting block 18 by means of a pair of screws which are received in holes 20 in the mounting block 18.

The staff 12 carries a balance wheel shown generally at 22 and which consists of a hub 24, crossarms 26 and rim 28. Suitable poising and balancing screws 30 are mounted in the rim for counterbalancing the coil presently to be described. The rim 28 of the balance wheel is interrupted at the side opposite the screws 30 and a generally pie-shaped coil 32 is mounted between the ends of the rim by means of a pair of small brackets 34 and 36 which are cemented to the coil and attached to the rim by means of screws 38 and 40. One end of the coil 32 is connected to the rim 28, as at 42, while the other end of the coil is wrapped around and soldered to a bracket 44 to which contact strip 46 is attached by means of a screw 48.

The contact strip is secured to the bracket 44 by the screw 48 passing through a slot 50 in the contact strip. This slotted connection allows the contact strip to be positioned radially of the balance wheel to provide for any small differences in the size of the coils or in the distance that the coil is mounted from the balance staff.

A roller table 52 is carried by the hub 24 and serves to support the contact strip 46. A layer of insulation 54 prevents the contact strip 46 from contacting the roller table 52 and hub 24. The contact strip curves substantially in a semi-circle around the staff and terminates in a vertical finger 56. The roller table also carries on the extended portion thereof a pin 58.

A spiral hairspring 60 is mounted on the staff 12 and has its outer end fastened to a pin 62 on the balance cock 16. A regulator assembly 64 is also mounted on the balance cock 16 and has a pin 66 engaging the hairspring 60 in a conventional manner.

A plate 68 secured to the mounting plate 10 carries a first post 70 and a second post 72. Each of these posts has respectively mounted thereon a collet 74 and 76 and each post is insulated from the plate 68 and mounting plate 10 by an insulating sleeve 78. The collets 74 and 76 are friction held to their respective posts and may be rotated about the posts. Slots 80 and 82 are formed in the respective collets 74 and 76 and are angularly positioned with respect to each other by the aforementioned rotation.

A controlling spring arm 84 is mounted in the slot 80 of collet 74. A second spring arm 86 is mounted in the slot 82 of the collet 76. The second spring arm 86 is mounted at a slightly higher level above the mounting plate 10 than is the controlling spring arm 84 and is prevented from swinging over and beyond the arm 84 by a tab 88 which projects upward from the spring arm 84 into the path of swinging movement of the arm 86. The second spring arm 86 carried at its end a substantially conical shaped contact 90 adapted to engage the vertically positioned end 56 of the contact strip 46.

The first spring arm 84 mounted in the collet 74 serves as a controlling and limiting member, through engagement of the second spring arm 86 with the vertical tab 88 and is hereafter referred to as the controlling spring arm. The second arm 86 carries the contact 90 and is hereinafter referred to as the contact carrying spring arm. The controlling spring arm 84 is longitudinally adjustable in the slot 80, which longitudinal adjustment controls the position at which its end 92 contacts the forward face of the pin 58 as shown in Figure 10, being adjustable between the limits as shown in the solid lines to that shown in the broken lines. This adjustment can be used to partially control the duration of contact.

The controlling spring arm 84 is still further adjusted in its angular relation to the contact carrying spring arm 86 by rotating the collet 74 about the post 70. The latter of these adjustments can be made during the operation of the isochronal devices. The contact carrying spring arm 86 is adjustable in a like manner, that is, longitudinally in the slot 82 and angularly by moving the collet 76 about its post 72. This, too, partially controls the duration of contact. Further, the angular adjustment of the collet 76 on the post 72 provides stress in the contact spring arm 86 and determines the force between the contact 90 and the upright end 56 of contact strip 46.

Each of the spring arms is normally positioned angularly so that if unrestrained they would cross one above the other. This crossing, however, is prevented by the engagement of the spring arm 86 with the vertical tab 88 so that both spring arms are maintained in a stressed position, each directing a force against the other.

The spring arms are rectangular in cross section and are comparatively long. The comparative length of the spring arms permits the balance wheel on its oscillation in a clockwise direction in Figure 1, wherein no contact is made, to move the springs arms from the path of the contact with a minimum expenditure of energy. The pin 58 is generally hemispherical in shape with the flat surface 92 disposed to engage the controlling spring arm 84 when the balance wheel rotates in a counterclockwise direction. The hemispherical backside 94 of the pin is cut away at 96 so as to permit a quick disengagement of the pin with the controlling spring arm.

A pair of small cylindrical magnets 98 and 100 are mounted on a shunt member 102 which is received in a cutaway portion 104 of the mounting plate 10. The magnets are disposed beneath the radial arms 106 and 108 of the pie-shaped coil 32. The magnets are secured in position by being friction-fitted into bores in a non-magnetic member 110 which is fastened to the mounting plate 10. A second shunt member 112 overlies the magnets 98 and 100 and is mounted on a pair of posts 114 and 116 carried by the bottom shunt 102. The two shunts are secured together onto the posts by a pair of screws and the posts and screws may be of a magnetic material. The upper surface of the magnets 98 and 100 are of opposite polarity.

A suitable battery is connected to the mounting plate 10 to which one end of the coil is grounded through the balance wheel, staff, hairspring, balance cock and mounting post 18. The other terminal of the battery is connected to the post 72 which carries the contact spring arm 86. Upon oscillation of the balance wheel current flowing from the battery energizes the coil at the moment that it is in the magnetic field and produces a magnetic thrust against the coil which is transmitted to the balance wheel. This impulse together with the reaction of the hairspring produces oscillating motion of an isochronal nature.

The oscillation of the balance wheel moves the roller table 52 and its pin 58 and contact finger 56. The oscillating movement of the pin and the contact member 56 causes the forward face of the pin to engage the end of the controlling spring arm 84 and move it upwardly. Swinging movement of the controlling arm is followed by a like movement of the contact carrying spring arm 86 in the same direction by reason of the stress within the arm. Further movement of the pin 58 in a counterclockwise direction moves the controlling arm 84 upwardly causing the end to move across the forward face 92 and bringing the contact 90 into engagement with the upright finger 56. Immediately upon engagement of the contact point 90 with the face of the finger, the movement of the contact carrying spring arm is restrained and the stress within that arm is partially absorbed at the contact making point.

It is thus seen that the contact 90 is urged against the face of the finger 56 with a predetermined force so that there is no possibility of chatter between the contact point and the finger. This minimizes arcing between the contact point and finger and holds the contacts against the finger throughout the contact making period with substantially the same force. Further movement of the roller table and its accompanying pin 58 moves the end of the controlling spring arm 84 over the rounded edge 118 of the pin 58 whereupon it drops sharply away from the pin because of the cutaway face 96. This sharp dropping snaps the upright tab 88 of the controlling spring arm against the contact carrying spring arm causing a sharp break in the contact, snapping the spring arms 84 and 86 back to a normal position.

During the contact making operation, that is from the time the contact 90 contacts the face of the finger 56 until it is broken by movement of the controlling spring arm 84, there is a relative motion across the face of the upright finger 56 by the contact 90. This tends to preserve a clean contact-making surface at all times.

During the backward movement of the balance wheel the spring arms are engaged by the pin 58 and swung from the path of its movement. This engagement takes place by the end of the controlling arm 84 engaging the face 96 of the pin 58 and moving both the spring arms downwardly until the end of the controlling spring arm 84 slips past the edge 118 of the pin. The comparative long length of the spring arms makes it possible for the balance wheel to push the spring arms out of position on its backward oscillation with a minimum expenditure of energy and with a minimum of interference with the isochronal movement.

The battery used to energize the coil may be an extremely small battery of the disc type such as is shown in assignee's copending application Serial No. 550,565, filed December 2, 1955. With such a small battery the entire isochronal element may be constructed in extremely miniaturized form and is capable of running for extended periods of time in excess of a year.

Mounted on the staff 12 is a roller table 120 carrying a roller 122. This roller collaborates with the fork 124 of a pallet level 126 mounted on a staff 128 journaled between the mounting plate 10 and balance cock 16. The outer end of the balance cock comprises a resilient spring 130 carrying a contact 132. A pair of stationary contacts 134 and 136 are mounted on a pair of insulating posts 138 and 140 secured to the base plate 10. The contacts 132, 134 and 136 are preferably made of magnetic material to provide better contact action as explained more fully in my copending application Serial No. 679,641, filed August 22, 1957, now Patent No. 2,889,471. It will thus be seen that as the balance wheel 22 oscillates, the roller 122 cooperates with the fork 124 to move contact 132 into alternate engagement with stationary contacts 134 and 136.

The isochronal unit is associated with a minimum reluctance type motor generally indicated at 142. This motor may consist of a rotor 137 and four stator poles 144, 146, 148 and 150, each having a winding 152, 154, 156 and 158. Each of these coils or windings has one terminal thereof connected to ground. Opposed poles 144 and 148 have the other terminals of their coils 152 and 156 connected together by means of a conductor 160 which is connected to the stationary contact 134. The terminals of the coils 154 and 158 on poles 146 and 150 are connected together through a conductor 162 and to the stationary contact 136. The staff 128 of the pallet is connected by conductor 164 to one terminal of a source of power supply which is shown as a battery 166. The other terminal of the battery 166 is connected to ground.

When contact is made between the pallet contact 132 and stationary contact 136, a circuit is completed between the battery 166 and the coils 154 and 158 on poles 146 and 150. These coils are wound in such a manner as to present a south pole and north pole respectively to the armature 137.

When the contact 132 engages stationary contact 134, windings 152 and 156 are energized to present south and north poles respectively to the armature 137.

Figure 5:
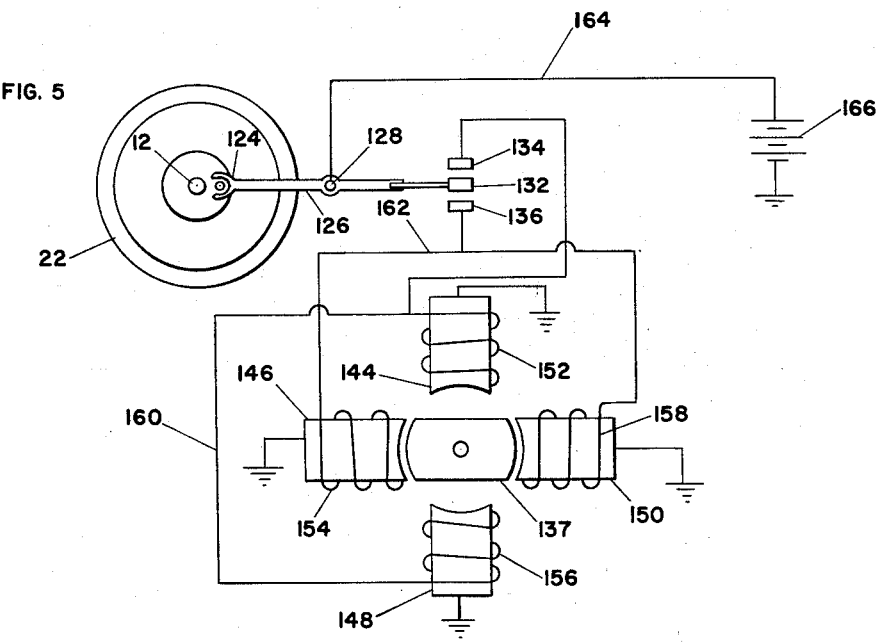
Figure 5 shows the isochronal control device connected to control the speed of rotation of a motor.

The ferro-magnetic armature 137 attempts to align itself with the magnetic field so as to form a path of minimum reluctance. As an example, when poles 146 and 150 are magnetized the ferro-magnetic armature 137 is acted upon to align itself with poles 146 and 150, as shown in Figure 5. However, the poles 146 and 150 are energized only for a fraction of a second before the contact system switches the current in a manner to energize or magnetize poles 144 and 148. Since the armature 137 possesses a certain amount of inertia, it continues to rotate out of the position shown in Figure 5 to a position in which it is aligned with the new field created by the magnetization of poles 144 and 148. Once the armature 137 is brought up to a speed which will keep it in phase with the alternate fields created by the poles of the motor, it continues to rotate in synchronism at this speed. The motor is thus a synchronous motor and its speed of operation is controlled within very highly accurate degrees of tolerance by the isochronal control element.

It will be apparent that a unit of this type may be supplied in a very small size and may be completely portable, being operative over very long periods of time dependent only upon the life of the batteries involved. While two batteries are shown, it will be obvious that the battery 166 used to drive the motor could also be used to operate the isochronal device. While the unit shown utilizes contacts which obviously can carry only a limited current, it will be apparent to those skilled in the art that it is possible to use this limited current to control high current switching devices such as thyratrons or other similar devices. Control circuits suitable for this use are shown in assignee's copending application Serial No. 660,003, filed May 31, 1957.

The invention may be embodied in other specific forms without departing from the spirit or essential characteristics thereof. The present embodiment is therefore to be considered in all respects as illustratative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A chronometric motor device comprising a frame, a staff rotatably mounted on said frame, a hair spring connected between said staff and frame, electromagnetic prime moving means having a portion thereof mounted on said staff and a portion mounted on said frame, a source of electric power connected to said prime moving means for periodically impulsing said staff and in cooperation with said hair spring sustaining said staff in isochronal oscillation, switching means associated with said staff and frame, and an electric motor receiving power through said switching means so that the speed of said motor is governed by the period of said isochronal oscillation.

2. A chronometric motor device as set out in claim 1 wherein said switching means comprises a forked pallet pivoted to said frame and carrying a contact at the outer end thereof, the forked end of said pallet engaging a pin carried on a plate on said staff, so as to cause said contact to reciprocate, at least one stationary contact mounted on the side of said pallet carried contact and engageable therewith upon oscillation of said pallet, said contact being connected to control the flow of power to said motor.

3. A chronometric motor device as set out in claim 2 wherein said motor comprises a first pair of spaced stator poles in axial alignment and having an armature mounted for rotation therebetween, a second pair of spaced stator poles mounted on either side of said armature on a longitudinal axis at an angle to the longitudinal axis of the first pair of spaced stator poles, each of said poles having coil means thereon supplied with current by means of said contacts.

4. A chronometric motor device comprising a coil mounted for oscillation on a staff, means creating a relatively concentrated magnetic field through which said coil moves as it oscillates, a battery associated with switch means for periodically energizing said coil when it is in said field, a motor, a source of power for said motor, and motor switch means driven by said staff and controlling the flow of power to said motor to accurately determine its speed.

5. A chronometric motor device as set out in claim 4 wherein said motor switch means comprises a pallet driven by said staff and carrying a contact, a pair of stationary contacts mounted on either side of said pallet carried contact, said contacts being connected to control the flow of power to said motor.

6. A chronometric motor device as set out in claim 5 wherein said motor comprises at least four poles positioned radially about a rotor in alined pairs, windings on said poles, the windings on one pair of poles being connected to one stationary contact and the windings on the other pair of poles being connected to the other stationary contact.

References Cited in the file of this patent
UNITED STATES PATENTS

| 2,523,298 | Haydon | Sept. 26, 1950 |
| 2,806,908 | Van Horn | Sept. 17, 1957 |

FOREIGN PATENTS

| 336,868 | Great Britain | Oct. 23, 1930 |